June 14, 1966     R. O. BRADLEY     3,256,486
SERVO MEASURING SYSTEM USING BELT DRIVE
Filed Sept. 18, 1961     2 Sheets—Sheet 1
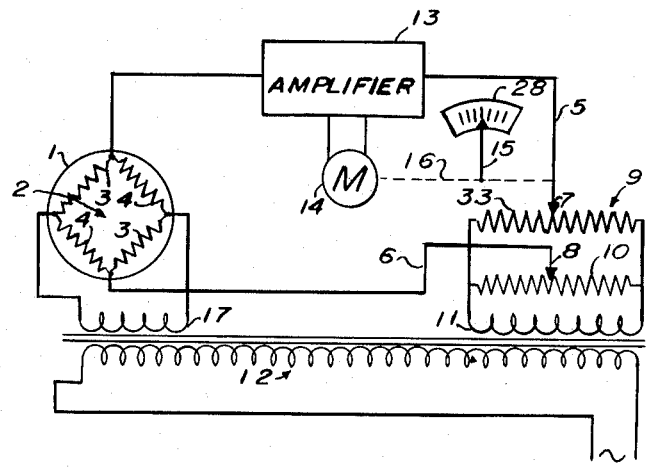
_Fig. I_
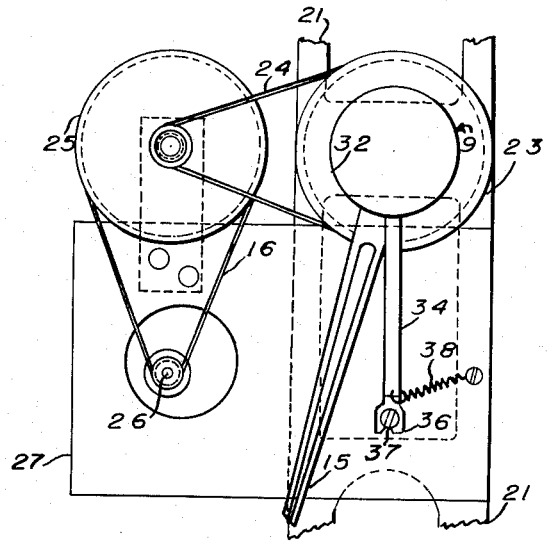
_Fig. II_
INVENTOR.
ROBERT O. BRADLEY
BY
Marshall, Marshall & Yeasting
ATTORNEYS

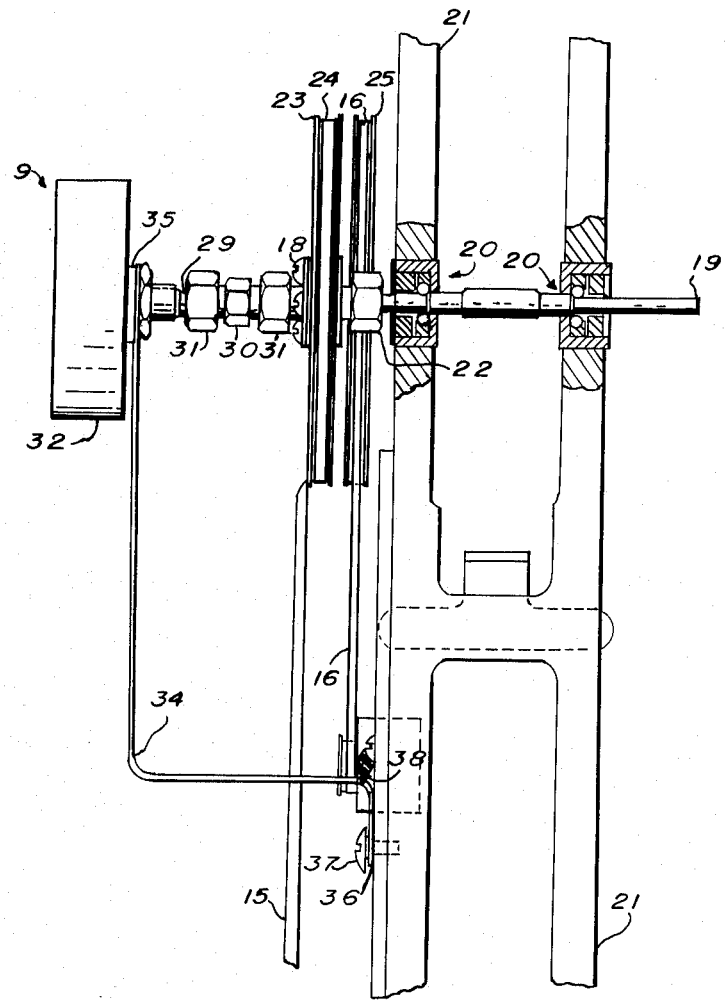
Fig. III
INVENTOR.
ROBERT O. BRADLEY
BY
Marshall, Marshall & Geasting
ATTORNEYS

United States Patent Office 3,256,486
Patented June 14, 1966

3,256,486
SERVO MEASURING SYSTEM USING
BELT DRIVE
Robert O. Bradley, Toledo, Ohio, assignor to Toledo
Scale Corporation, Toledo, Ohio, a corporation of Ohio
Filed Sept. 18, 1961, Ser. No. 140,165
4 Claims. (Cl. 324—99)

This invention relates to servo systems and more particularly to a belt drive associated with a servo system and this application is a continuation-in-part of application Ser. No. 632,191, filed Jan. 2, 1957, and now abandoned which in turn is a continuation-in-part of application Ser. No. 580,324, filed Apr. 24, 1956, and now abandoned.

The belt drive is particularly well suited for use in a servo system of high gain in which servo means compensate for very small error voltages. An example of such a servo system can be found in many electrical or electronic weighing scales. It was assumed, mistakenly, heretofore, that the servo motors of such servo means must not be allowed to slip and, therefore, prior servo systems are equipped with gear drives between the servo motors and the elements driven thereby. Such gear drives are generally unsatisfactory because of their inherent backlash which causes instability.

Prior servo systems have never been equipped with slippable belt drives between the servo motors and the elements driven thereby because it was assumed that slipping belts certainly would wear out quickly both themselves and their sheaves or pulleys, and it was known that if used such belt drives must be so mounted that slipping could occur whenever the servo motor-driven elements were stopped at the ends of their paths of travel while the servo motors continued to run. Hence, belt drives mounted to slip are unknown in servo systems.

The problem of gear train backlash in servo systems of high gain was recognized in U.S. Patent No. 2,688,112 issued on Aug. 31, 1954, to Floyd T. Wimberly wherein the gear train backlash in a high gain servo system was taken up by causing the servo motor to continually oscillate just enough to take up the backlash but not enough to move the output indicator.

The objects of this invention are to improve servo systems, to increase the precision of such systems, to simplify the construction of such systems, and to eliminate gear train backlash in such systems.

One embodiment of this invention enabling the realization of these objects is a combination of means for generating an output potential, an alterable signal source supplying a signal in opposition to the output potential, the signal source including a movable member movements of which alter the signal, stop means defining a path in which the member is movable, servo means responsive to differences between the output potential and the signal for moving the movable member to alter the signal to a level balancing the output potential, and drive means including a belt coupling the servo means to the movable member, the belt slipping when the movable member is stopped by the stop means while the servo means is running.

In accordance with the above, one feature of this invention resides in providing a servo system with a slippable belt drive between a servo motor and the element or elements driven thereby. Slipping of the belt on its pulleys or sheaves occurs whenever the servo motor-driven element or elements are stopped at the ends of their paths of travel while the servo motor continues running. It was assumed, mistakenly, heretofore, that servo motors must not be allowed to slip because it was thought that slipping belts would quickly wear out both themselves and their sheaves or pulleys. However, the belt drive of the invention has been operated continuously in a test for several months, i.e., the belt was allowed to slip for several months, and it was found that neither the belt nor its pulleys or sheaves were apppreciably worn. This test is the equivalent of at least several years of normal operation.

It has been found that the improved servo system is particularly well-suited for use in electrical or electronic weighing scales. All prior electrical or electronic weighing scales of the servo type incorporate gear drives between the servo motor and the element or elements driven thereby. The difference between the action of such prior weighing scales and weighing scales using the servo systems of the invention is strikingly noticeable. All prior electrical or electonic weighing scales, because of the inherent backlash in gear drives, oscillate at the balance point, i.e., their indicators oscillate at the balance point, producing slowly obtained and inaccurate weighing results. In sharp contrast, the indicator in a weighing scale incorporating the servo system of the invention comes quickly and smoothly to the balance point and halts. The difference between the action of the prior weighing scales and that of the weighing scales using the belt drive is marked and must be seen to be fully appreciated. Should the servo motor in the servo system of the invention continue to run while the servo motor-driven elements, such as the indicator, are stopped at either ends of their paths of travel, and this is often the case, the belt drive slips without damage either to a belt or its sheaves.

The above and other objects and features of this invention will be appreciated more fully from the following detailed description when read with reference to the accompanying drawings wherein:

FIG. I is a schematic wiring diagram showing the essential components of an electronic weighing scale;

FIG. II is a fragmentary elevational view of the electronic weighing scale showing an output indicator and a potentiometer both of which are driven from a servo motor by a belt drive and the supporting framework therefor; and FIG. III is an enlarged end elevational view, partly in section, as seen from a position to the right of and looking toward the apparatus shown in FIG. II.

These specific figures and the accompanying description are intended merely to illustrate the invention and not to impose limitations on the claims.

Referring to FIG. I, the electronic weighing scale includes a load cell 1 that comprises a resistance wire strain gage bridge 2 having resistance elements 3 in two of its legs and resistance elements 4 in the other two legs. The bridge 2 is of an ordinary type used in gages available for measuring strain wherein the elements 3 and 4 are adapted to change in resistance with changes in a condition to be measured, e.g., load applied to the load cell 1. It is to be appreciated, however, that other forms of electrical translators or transducers which produce electrical signals that are functions of the loads applied to the load cell 1 may be used in place of the strain gage bridge 2.

In order that the point from which the measurements are made may be adjusted and that measurements of the values from such point may be obtained, there are provided conductors 5 and 6 from the output terminals of the bridge 2 to sliding contacts 7 and 8 of potentiometers 9 and 10, respectively, connected at their ends and energized from a secondary winding 11 of a transformer 12. An amplifier and motor control device 13 is connected in circuit with the conductor 5 and controls the operation of an ordinary reversible, two-phase servo motor 14 which both positions an indicator 15 and the sliding contact 7 through a belt 16. The sliding contact 8 is adapted to be positioned manually. A secondary winding 17 of the transformer 12 is connected to the bridge 2 for energizing the latter.

The bridge 2 forms a balanceable network that is adapted to be unbalanced in response to changes in load applied to the load cell 1, i.e., the network develops an output voltage or potential between the conductors 5 and 6 which is a function of load applied to the load cell. This output voltage opposes the signal or output voltage of the potentiometers 9 and 10 which form a bridge circuit, the pontentiometer 9 driven by the servo motor 14 serving as a continuously automatically adjustable voltage source or alterable signal source. The output voltage of the bridge network opposes the output voltage of the potentiometer circuit connected thereto to determine the flow of current through the amplifier and motor control device 13. An unbalance of the output voltages results in operation of the servo motor 14 to turn the indicator 15 through a distance proportional to the load placed upon the load cell and contact 7 until the opposing voltages are equal, whereby input voltage to the amplifier 13 is restored to null. An adjustment of contact 8 results in a change in the positions of contact 7 to produce a balance for predetermined conditions to be measured. The positions of contact 7 are representative of the conditions measured, and a changing of these positions by manual adjustment of contact 8 merely results in an indication of the values from a different zero point.

Referring to FIGS. II and III, the indicator 15 is fixed to a hub 18 carried on an end of an indicator shaft 19 mounted for rotation in ball bearings 20 supported by an upstanding frame 21. The hub 18 has a slotted and threaded portion upon which a nut 22 is turned to squeeze the slotted portion around the end of the indicator shaft 19 thus rigidly coupling the hub and the shaft. The hub 18 also carries a sheave 23 which is turned by a belt 24 driven by a second sheave 25 that is driven in turn from the shaft 26 of the servo motor 14. The servo motor 14 is shown schematically in FIG. I as driving the indicator 15 and the contact 7 of the potentiometer 9 through the belt 16. In the actual structure as shown in FIGS. II and III, the belt 16 is driven by the shaft 26 of the servo motor 14 and is connected to the indicator 15 and to the contact 7 of the potentiometer 9 through the second sheave 25, belt 24 and sheave 23. Both the servo motor 14 and sheave 25 are mounted on a supporting plate 27 secured to the upstanding frame 21. The weight of any load within the capacity of the eletcronic scale placed upon the load cell 1 (FIG. I) is indicated by the indicator 15 on an indicia-bearing chart 28 which is shown schematically in FIG. I, i.e., the output potential of the bridge 2 is indicated in terms of weight. The belts 16 and 24 are mounted to slip on their respective sheaves should any part of the system driven by the belts be stopped while the servo motor 14 continues to run.

When an unbalance of output voltage results in operation of the servo motor 14 to position the contact 7 of the potentiometer 9, it is of course necessary that the indicator 15 be driven by the servo motor 14 to exactly the correct point on the chart 28. For this reason, the servo motor 14 is connected by means of the belt drive to the indicator shaft 19 and to the shaft 29 of the potentiometer 9, which shaft 29 positions the contact 7, by means of the sheave 23 that is a common drive means for both shafts, the shafts being axially aligned and rigidly coupled by means of a coupling 30. Thus, it is assured that the shafts 19 and 29 always turn as one. The coupling 30 includes slotted and threaded end portions upon which nuts 31 are turned to squeeze one of the slotted portions around the end of the potentiometer shaft 29 and to squeeze the other of the slotted portions around an extended part of the hub 18 thus rigidly coupling the shafts 19 and 29 in an axially aligned position. As may be seen in FIG. III, the entire potentiometer structure including its case 32 is supported from the indicator shaft 19, the case 32 being carried directly by the potentiometer shaft 29. Mounting the entire potentiometer structure 9 from the indicator shaft 19 allows lateral motion of the potentiometer case 32 to accommodate misalignment of the shafts 19 and 29. As a practical matter, no more than two bearings may be mounted on a rigid shaft without having a binding action occur in the bearings. That is, any misalignment of such a shaft will attempt to cause a wobbling motion which although it cannot actually take place if the three or more bearings are rigidly mounted will cause binding in the bearings. Binding action means friction and friction is always to be avoided in weighing scales if they are to provide accurate weighing indications. In the manufacture and assembly of the indicator shaft 19, the hub 18, the coupling 30, and the potentiometer shaft 29, which altogether are in effect one rigid shaft, misalignment relative to the axis of rotation is almost sure to occur. Four bearings are used to support said rigid shaft, i.e., the two bearings 20 which are rigidly mounted in the frame 21 and the usual two bearings within the case 32 that rotatably support the potentiometer shaft 29. Hence, if the case 32 were to be rigidly supported in any manner, binding action in the bearings would almost certainly occur. However, the mounting hereinbefore described permits lateral motion of the entire potentiometer structure to occur so that no binding occurs in the bearings even through there is misalignment between the indicator shaft 19 and the potentiometer shaft 29. That is, wobbling motion of misaligned shafts is permitted and two of the four bearings are allowed to move with such motion.

Rotation of the potentiometer shaft 29 which positions the sliding contact 7 may not be permitted to rotate the potentiometer case 32 that non-rotatably supports the bearings for the shaft 29 and also the resistance 33 (FIG. I) for the sliding contact 7. Hence, the case 32 is provided with a radially extending stop or strap 34 that engages the frame 21 to prevent rotation of the case while nevertheless allowing lateral motion of the case to accommodate misalignment of the shafts 19 and 29. The upper end of the stop or tongue 34 has a hole through which the potentiometer shaft 29 extends and is fixed to a shoulder 35 on the case 32. The lower end 36 of the stop or tongue 34 is shaped in the form of an inverted U and loosely engages the shoulder of a shoulder screw 37. A coil spring 38 one end of which is anchored to the frame 21 urges the U-shaped lower end of the strap or tongue 34 toward the shoulder of the screw 37 and keeps backlash out of the system. Thus, the stop or tongue 34 prevents rotation of the case 32 while nevertheless allowing the case to move laterally.

The stop or tongue 34 in addition to preventing rotation of the case 32 also functions as a stop for the indicator 15 and, thus, also as a stop for the potentiometer contact 7. As shown in FIG. II, either clockwise or counterclockwise rotation of the indicator 15 brings it into engagement with the stop 34. Accordingly, the stop 34 defines the path in which the indicator 15 is movable and also the path in which the potentiometer contact 7 is movable, since the indicator 15 and the potentiometer contact 7 move together as one. The indicator 15 and the stop 34 may be considered together as a stop means having a part, i.e., the indicator 15, carried by the shaft 19, the shafts 19 and 29 being in effect one shaft.

In operation, load placed upon the load cell 1 produces one of two effects. If the load is within the capacity of the chart 28 and the potentiometer 9, the indicator 15 and the potentiometer slider 7 come quickly and smoothly to the balance point and halt, the weight of the load being indicated on the chart 28. If the load is beyond the capacity of the chart 28 and the potentiometer 9, the indicator 15 and the potentiometer slider 7 rotate until the indicator 15 engages the stop 34, the servo motor 14 continuing to run with the belts 16 and 24 slipping on their respective sheaves. Often under such circumstances, electrical "unit weight," not shown, i.e., reserve alterable signal sources, are switched into the circuit until the input voltage to the amplifier 13 is restored to null. It is imperative that the stop be provided to prevent the potentiometer slider 7 from being driven off the potentiometer resistance 33 which would throw the servo system out of control. When the load is removed from the load cell 1, one of two similar effects are obtained. Either the servo motor 14 drives the indicator 15 and the potentiometer slider 7 toward their zero positions until the input voltage to the amplifier 13 is restored to null, the weight of any load being indicated on the chart 28, or the servo motor 14 drives the indicator 15 and the potentiometer slider 7 toward their zero positions until the indicator 15 engages the stop 34, the belts 16 and 24 slipping on their respective sheaves.

Prior servo systems have never been equipped with slippable belt drives between the servo motors and the elements driven thereby, e.g., indicator hands and potentiometer sliders, because it was assumed, mistakenly, that slipping belts certainly would wear out quickly both themselves and their sheaves or pulleys, and it was known that if used such belt drives must be so mounted that slipping could occur whenever the servo motor-driven elements were stopped at the ends of their paths of travel while the servo motors continued to run. However, it has been found that the present belt drive is a very satisfactory means from both the standpoint of efficiency and low cost for driving the indicator and the potentiometer shaft. The indicator 15 comes quickly and smoothly to the balance point and halts—a far superior action to the oscillation at the balance point experienced in prior servo systems. Furthermore, the above test proves that in years of normal operation slipping of the belts 16 and 24 will not appreciably wear either such belts or their sheaves.

Various modifications may be made in details without departing from the scope of the claims.

Having described the invention, I claim:

1. A servo system comprising, in combination, a first shaft mounted for rotation, means for generating an output potential, an alterable signal source supplying a signal in opposition to the output potential, said means being able to produce a potential larger than the maximum signal which the source can produce, the signal source including a movable member carried by the first shaft movements of which member alter the signal, the movable member always moving together as one with the first shaft, servo means responsive to differences between the output potential and the signal for driving the first shaft and thus for moving the movable member to alter the signal in a balancing direction and having an output shaft which can be rotated continuously, means including a belt coupling the output shaft to the first shaft, and stop means for stopping the member at either end of its path of travel, the belt slipping when the first shaft and the member are stopped by the stop means while the output shaft is rotating.

2. A servo system according to claim 1 wherein the stop means includes a part carried by the first shaft.

3. A servo system according to claim 1 wherein indicating means also are carried by the first shaft for indicating the output potential.

4. A servo system according to claim 3 wherein the indicating means also functions as a part of the stop means.

References Cited by the Examiner

UNITED STATES PATENTS

| | | | |
|---|---|---|---|
| 1,872,851 | 8/1932 | Van Weenen | 177—212 X |
| 1,979,588 | 11/1934 | Vreeland | 318—29 X |
| 2,069,440 | 2/1937 | Hathorn | 338—170 |
| 2,423,480 | 7/1947 | Caldwell | 318—29 X |
| 2,516,092 | 7/1950 | Roessler | 340—187 |
| 2,621,233 | 12/1952 | Spalding | 324—99 X |
| 2,937,861 | 5/1960 | Maring | 177—211 |

WALTER L. CARLSON, *Primary Examiner.*

FREDERICK M. STRADER, *Examiner.*

A. C. WILLIAMS, C. F. DUFFIELD, R. V. ROLINEC, *Assistant Examiners.*